June 15, 1937.  N. H. SWANSON  2,084,227
DISINTEGRATING MILL
Filed Jan. 16, 1933

Inventor
Nils H. Swanson
By Harry C. Duff
Attorney

Patented June 15, 1937

2,084,227

UNITED STATES PATENT OFFICE 2,084,227

DISINTEGRATING MILL

Nils H. Swanson, Aurora, Ill.

Application January 16, 1933, Serial No. 651,999

1 Claim. (Cl. 83—11)

My invention relates to mills and more particularly to a mill for disintegrating grain coffee or similar materials.

It has become the practice in many communities to mount a mill upon a vehicle and move it from one job to another. A mill of this type should therefore be light and consume as little power as possible since the motive power therefore is usually mounted on the vehicle or derived from the driving means of the vehicle itself.

An object of the invention is to provide a mill which is light in weight and consumes a relatively small amount of power.

A further object is to provide a mill which will cut instead of crush or grind the material fed thereto.

A further object is to provide a mill having means for feeding the material by means of an air current and subsequently diverting the air current without carrying fine particles of the disintegrated material therewith.

Other objects and advantages will appear as the description proceeds.

Figure 1:
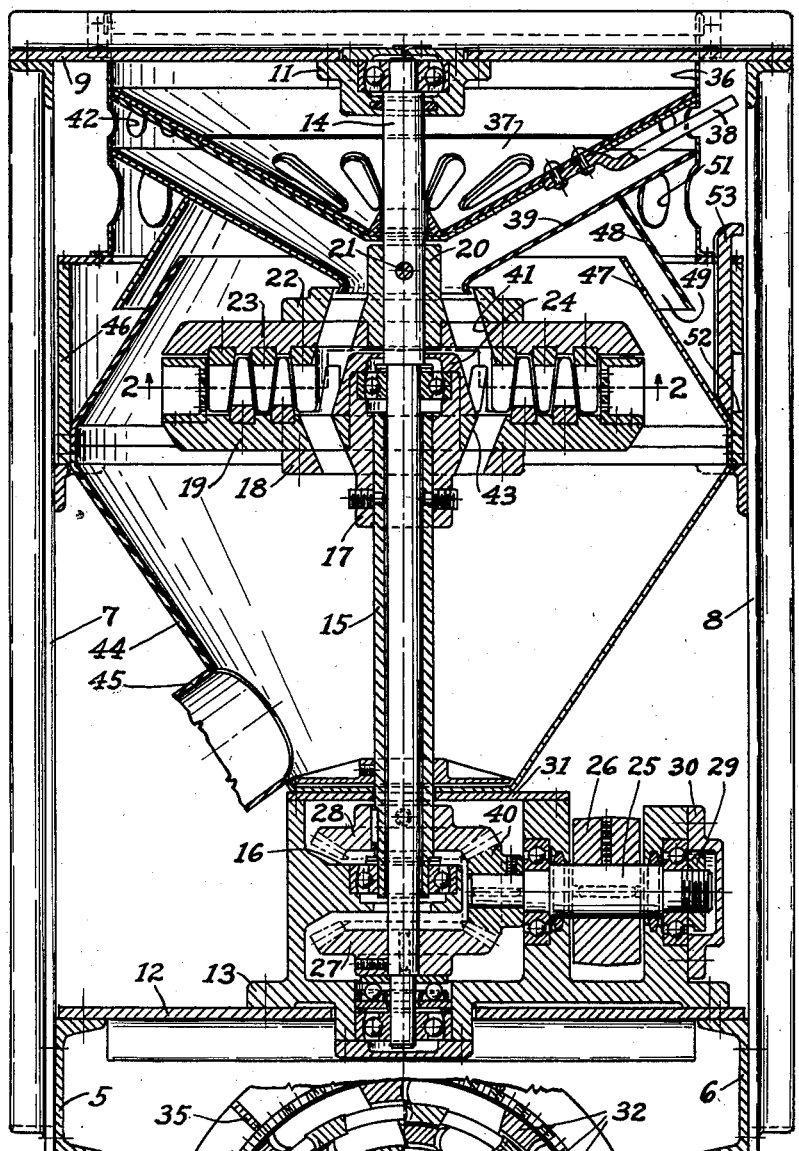
Figure 2:
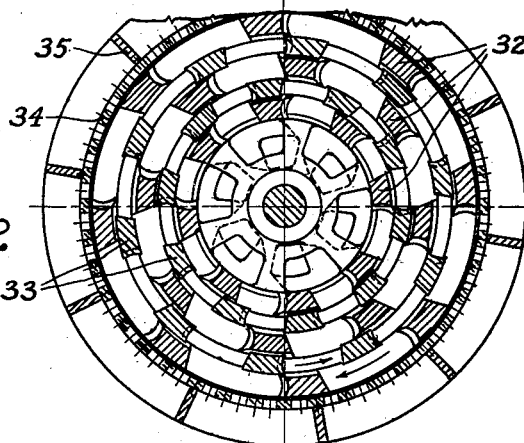

A complete understanding of the invention may be had by reference to the following description taken in conjunction with the accompanying drawing in which Fig. 1 is a vertical section through a mill embodying the invention, and Fig. 2 is a horizontal section taken on line 2—2 of Fig. 1.

The apparatus may be mounted on a pair of channel beams 5 and 6 by means of which it is mounted on a vehicle or other base (not shown). Secured to the channel beams and extending upwardly therefrom are a pair of angle beams 7 and 8 interconnected by a channel beam 9 at the upper ends thereof. The beam 9 has a bearing support 11 secured to the under side thereof and extending upwardly through the beam. A channel beam 12 is secured to and interconnects the channel beams 5 and 6 and has a housing 13 supported on the upper side thereof in vertical alignment with the bearing support 11. Bearing support 11 and housing 13 are provided with ball bearings for rotatably supporting a shaft 14.

A sleeve 15, on the lower portion of shaft 14, is rotatably supported at its lower end by a ball bearing co-operating with a central partition 16 extending inward from the walls of housing 13 and at its upper end by another sleeve 17 extending upward above sleeve 15 and provided with a ball bearing co-operating with shaft 14.

Sleeve 17 is provided with a radial flange 18 and a disc 19 provided with cutting teeth is mounted against the upper face of flange 18. Another sleeve 20 pinned on shaft 14 by a tapered pin 21 is also provided with a radially extending flange 22 and a disc 23 is mounted against the lower face of flange 22. A cap 24 surrounding the shaft 14 and secured around the upper end of sleeve 17 keeps dust and the material being distintegrated from the bearing and retains lubrication for the same at this point.

On a horizontal shaft 25, rotatably supported by ball bearings in housing 13 and driven through a pulley 26 is mounted a bevel gear 40 co-operating with a bevel gear 27 mounted on the shaft 14 and with another bevel gear 28 mounted on the sleeve 15. The outward end of shaft 25 is provided with a lock nut 29 and enclosed by a cover 30 which retains lubrication for the ball bearing at this point. A cover 31 on the top of housing 13 protects the gear mechanism and provides an enclosed oil chamber for lubrication purposes. It will be noted that through this gear mechanism the cutting discs 19 and 23 will roate in opposite directions relative to each other when the mill is driven through the pulley 26.

The disc 23 is provided with three circular rows of cutting teeth 32 preferably of eight teeth each while the disc 19 is provided with two circular rows of teeth 33 preferably of ten teeth each, the rows of the upper and lower teeth alternating. Due to this arrangement of the teeth only two diametrically opposite sets of teeth will be in cutting relation at a time and when these two sets of teeth have passed through the cutting position two other diametrically opposite sets of teeth will be in cutting relation. This arrangement results in a smooth and uniform distribution of the power required to operate the apparatus and since the sets of teeth performing a cutting operation are diametrically opposite a minimum of vibration of the apparatus will result.

The cutting edges of the teeth are preferably inclined from the vertical and the teeth are also preferably tapered as shown in Fig. 1, except that the inner side of the inner row of teeth is vertical and the outer side of the outer row of teeth is vertical. The lower disc 19 may carry a screen 34 which is circular and extends in close proximity to the outer row of teeth on disc 23. This screen has apertures therein of such size that the maximum size particle to be cut may pass therethrough. If any particles are not cut sufficiently fine between the teeth they will be caught in the screen and the outer row of teeth will cut the portion of particles extending from the apertures in the screen until all of the particles are of such size as to pass through the screen.

Mounted on the disc 19 and extending radially from the screen are a plurality of vanes 35 which form a fan and draw the material through the rows of teeth in which action the fan is assisted by centrifugal force due to the rotation of the discs.

The material to be disintegrated is fed into a hopper 36 provided with a shutter 37 having a lever 38 by means of which the rate of feeding may be regulated. From the hopper the material is fed into a funnel shaped receiver 39 which directs the material into apertures 41 in the upper disc. These apertures are preferably inclined in such a direction as to draw the material downwardly. The outer periphery of the funnel shaped receiver is provided with a plurality of apertures 42 for admitting air into the receiver to the fan. The lower disc 19 is also preferably provided with apertures 43 for permitting circulation of air through the rows of teeth to the fan.

In order to separate the currents of air from the disintegrated particles of material without carrying any of the fine particles with the air currents a device commonly known as a cyclone is provided around the mill, and comprises a cone 44 having an outlet 45 for the disintegrated material. The upper end of the cone is secured to a heavy metal ring 46. The purpose of this ring is to protect the operator in the event of breakage of the rapidly rotating disintegrating discs.

Abutting the upper end of cone 44 is a second cone 47 inverted with respect to the first cone and open for a large area at its apex. Above the cone 47 is a similar section of a cone 48 which is secured to the under side of the funnel shaped receiver 39 and provides an air outlet 49 from the cyclone from which the air may escape through large apertures 51 into the atmosphere. Any dust which may collect around the outside of cone 47 may be removed through an aperture 52 in ring 46 which is normally closed by a sliding door 53.

When the disintegrated material is thrown radially outwardly by the fan it also has a rotational movement whereby it is caused to rotate within the cones along the walls until it loses its rotational force and settles to the bottom, while the air passes upwardly and out of the cones.

It will be understood that the embodiment of the invention herein described is merely illustrative of the invention and that many changes and modifications may be made therein without departing from the spirit and scope of the invention.

What I claim as new and desire to secure by United States Letters Patent is:

In a mill, a pair of discs rotatable in a horizontal plane, means for rotating said discs in opposite directions, alternating circular rows of cutting teeth on said discs, means for supplying material to be disintegrated through apertures in the upper disc, a screen surrounding the outer row of teeth on one of said discs, a fan carried by one of said discs, and closed downwardly extending conoidal walls surrounding the mill including means for positively directing the material downwardly for separating the disintegrated material from the air currents set up by the fan.

NILS H. SWANSON.